(12) United States Patent
Smith

(10) Patent No.: US 9,864,204 B2
(45) Date of Patent: Jan. 9, 2018

(54) HIGH ORDER FOCUS IN LASER RADAR TOOLING BALL MEASUREMENTS

(71) Applicant: Nikon Corporation, Tokyo (JP)

(72) Inventor: Daniel Gene Smith, Tucson, AZ (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/048,963

(22) Filed: Feb. 19, 2016

(65) Prior Publication Data

US 2016/0246063 A1 Aug. 25, 2016

Related U.S. Application Data

(60) Provisional application No. 62/119,041, filed on Feb. 20, 2015.

(51) Int. Cl.
| | |
|---|---|
| *G02B 5/122* | (2006.01) |
| *G02B 27/09* | (2006.01) |
| *G01S 17/32* | (2006.01) |
| *G01S 7/481* | (2006.01) |
| *G01S 7/497* | (2006.01) |

(52) U.S. Cl.
CPC ........ *G02B 27/0927* (2013.01); *G01S 7/4812* (2013.01); *G01S 7/497* (2013.01); *G01S 17/325* (2013.01); *G02B 5/122* (2013.01); *G01S 7/4818* (2013.01)

(58) Field of Classification Search
CPC ......... G01B 11/00; G01J 3/0237; G01J 3/027; G01J 9/00; G01J 1/00; G01S 17/58; G01S 17/325; G01S 17/88; G01S 7/4812; G02B 23/00; G02B 23/06; G02B 23/0816; G02B 27/0927; G02B 27/40; G02B 27/003; G02B 6/262
USPC .... 356/28, 123, 28.5, 445, 4.01; 342/70, 71, 342/82
See application file for complete search history.

(56) References Cited

U.S. PATENT DOCUMENTS

| | | | | |
|---|---|---|---|---|
| 5,496,994 A | * | 3/1996 | Ohtake | G02B 7/32 250/201.6 |
| 6,548,797 B1 | * | 4/2003 | Ai | G01J 9/00 250/201.9 |
| 6,643,000 B2 | * | 11/2003 | Fluckiger | G01S 7/4802 356/28 |
| 7,158,075 B2 | * | 1/2007 | Nakamura | G01S 7/4802 342/70 |
| 7,705,972 B2 | * | 4/2010 | Holton | G01P 3/366 356/28 |
| 9,405,115 B2 | * | 8/2016 | Riddle | G02B 26/06 |
| 2013/0268096 A1 | * | 10/2013 | Riddle | G02B 26/06 700/9 |
| 2014/0009762 A1 | * | 1/2014 | Smith | G01N 21/55 356/445 |

(Continued)

*Primary Examiner* — David A Vanore
(74) *Attorney, Agent, or Firm* — Klarquist Sparkman, LLP

(57) ABSTRACT

Interrogation optical beams are focused or otherwise shaped for delivery to a target that includes one or more tooling balls so as to have a beam radius of curvature corresponding to a tooling ball radius. Focus values can be stored in a look-up table and can include two beam focus conditions that produce a selected beam focus. The two beam focus conditions are associated with a common beam curvature. The focus conditions are associated with beam curvatures within and without a Rayleigh range from a beam waist.

26 Claims, 11 Drawing Sheets

(56) References Cited

U.S. PATENT DOCUMENTS

2014/0063491 A1\* 3/2014 Smith .................. G01J 1/00
356/123
2016/0246063 A1\* 8/2016 Smith ............... G02B 27/0927

\* cited by examiner

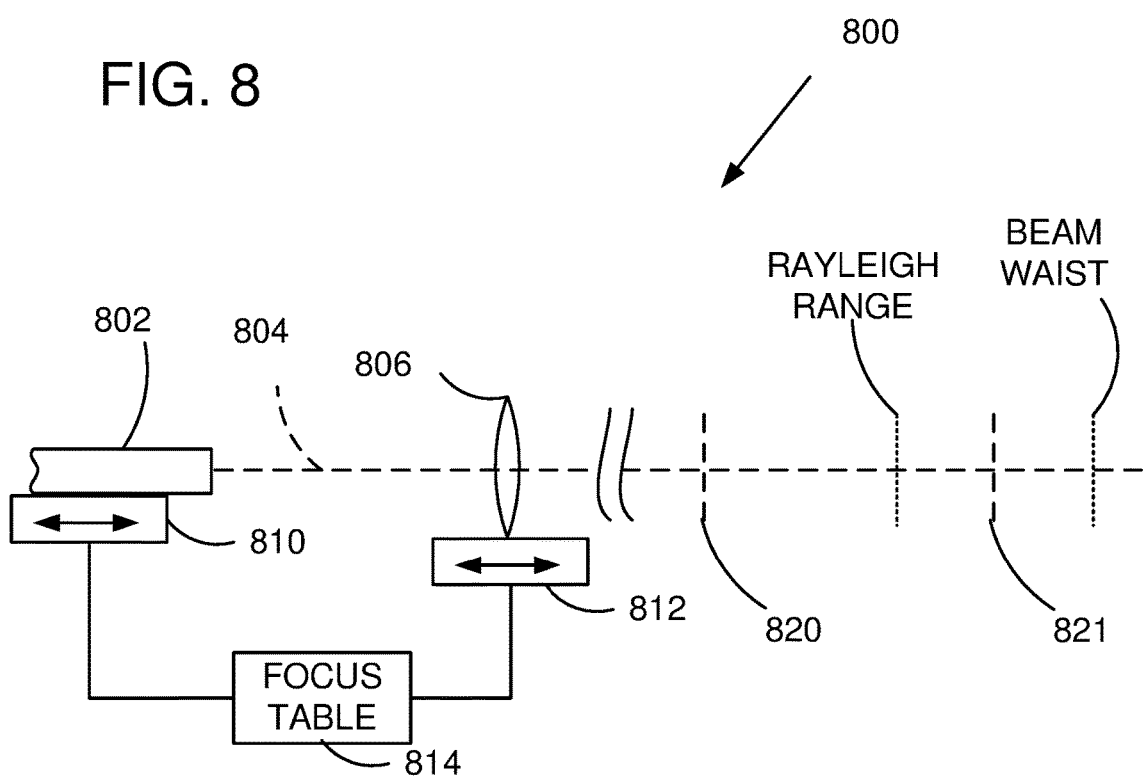

HIGH ORDER FOCUS IN LASER RADAR TOOLING BALL MEASUREMENTS

CROSS REFERENCE TO RELATED APPLICATION

This application claims the benefit of U.S. Provisional Application No. 62/119,041, filed Feb. 20, 2015, which is hereby incorporated by reference in its entirety.

FIELD

The disclosure pertains to laser beam focusing.

BACKGROUND

In laser radar and other optical measurement systems, beams are directed to a target surface and reflected portions are used to characterize the target surface. Sophisticated focus systems have been developed to maintain beam pointing accuracy. However, even with accurate beam pointing, reflected beam power can be low, increasing measurement time and increasing measurement accuracy. Alternative approaches are need to obtain superior measurement times and accuracies.

SUMMARY

Disclosed are optical systems and methods in which a beam is directed to a target feature based on a focus formula or adjustment mechanism that accounts for the divergence and wavelength of the beam and the size of the target feature such as a tooling ball diameter.

Representative methods comprise directing an interrogation optical beam to a target and adjusting the interrogation optical beam based on a target feature so that a radius of curvature of the interrogation optical beam corresponds to the target feature. In some examples, the target feature is a tooling ball radius of curvature and the radius of curvature of the interrogation optical beam corresponds to a tooling ball radius. In other examples, two beam focus locations having an interrogation beam radius of curvature corresponding to the target feature are determined, and the beam focus location that is closer to an interrogation beam waist is selected. In representative examples, the beam focus location that is at least a Rayleigh range from the interrogation beam waist is selected. In other embodiments, a plurality of focus adjustments corresponding to respective target distances is established, wherein the target distances are selected based on a radius of curvature associated with the target feature, wherein a radius of curvature of the interrogation optical beam is adjusted based on a selected focus adjustment. In still further examples, the focus adjustments are stored in a memory, and the interrogation optical beam is adjusted by retrieving the selected focus adjustment from the memory. In some cases, a target range is selected so that the radius of curvature of the interrogation optical beam corresponds the target feature.

Laser radars comprise an interrogation beam source and a focusing system that directs the interrogation optical beam to a target. The focusing system adjusts the interrogation optical beam so as to have a beam radius of curvature based on a target feature. In some examples, a memory stores a plurality of focus distances associated with the interrogation beam radius of curvature. In other examples, the focusing system selectively directs the interrogation optical beam to the target so that the interrogation beam radius of curvature corresponds to an interrogation beam location within a Rayleigh range defined by an interrogation beam waist. According to other examples, the focusing system selectively directs the interrogation optical beam to the target so that the interrogation beam radius of curvature corresponds to an interrogation beam location within a Rayleigh range of an interrogation beam waist or that is more distant than the Rayleigh range.

The foregoing and other objects, features, and advantages of the disclosed technology will become more apparent from the following detailed description, which proceeds with reference to the accompanying figures.

BRIEF DESCRIPTION OF THE DRAWINGS

FIG. 5B corresponds to FIG. 5A but with coupling efficiency plotted on a logarithmic scale.

FIG. 8 illustrates a representative focus adjustment system that delivers an optical beam to a target.

DETAILED DESCRIPTION

Figure 1:
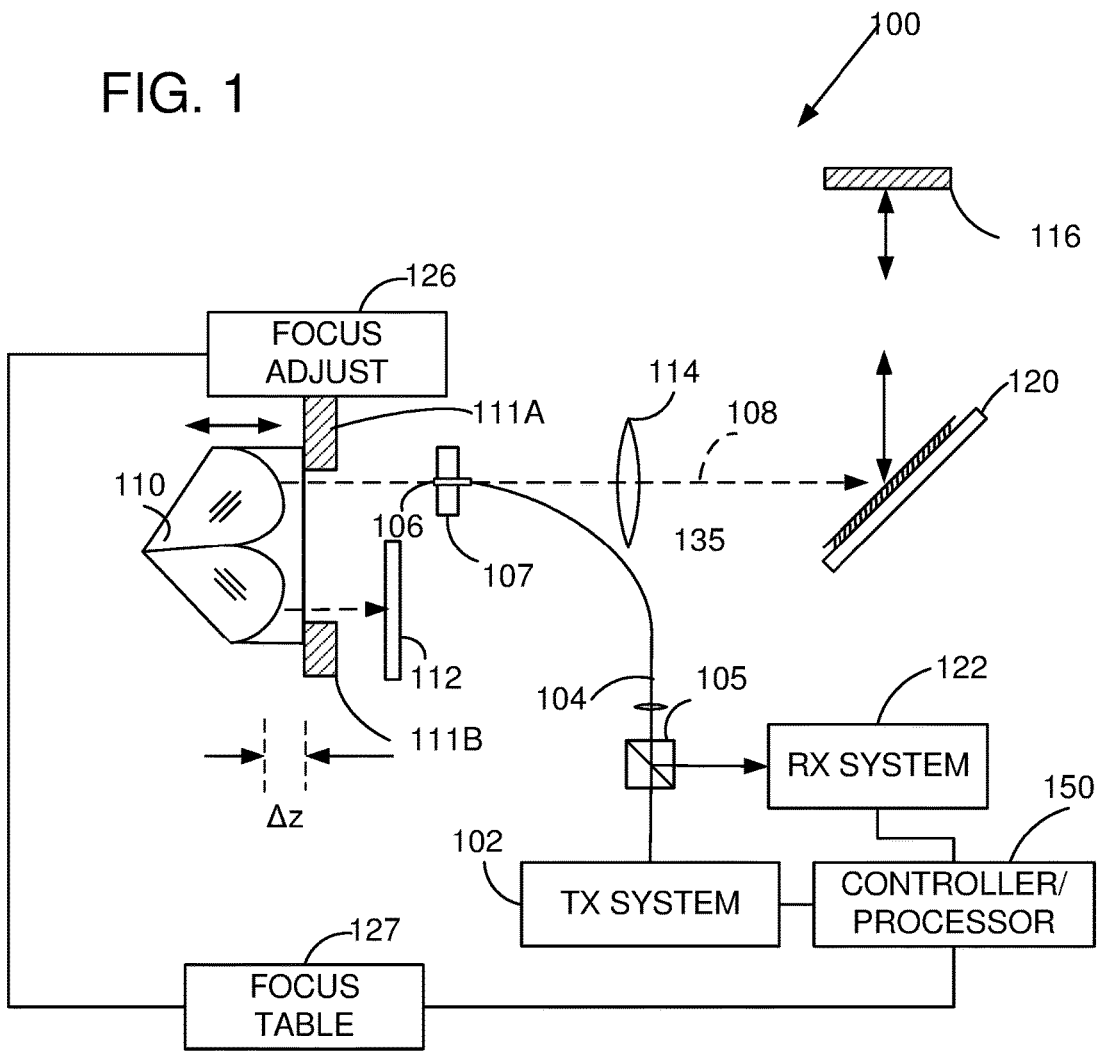
FIG. 1 illustrates a laser radar system that focuses an interrogation optical beam to have a radius of curvature associated with a target feature.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation. Beam wave fronts are referred to with reference to radii of curvature or, in some cases, curvatures, wherein a wave front curvature c is defined as a reciprocal of a beam radius of curvature R, i.e., c=1/R. In addition, in the disclosed examples, interrogation and other optical beams are illustrated as propagating in a lowest order transverse mode, but higher order modes can be similarly focused.

Representative Laser Radar System

With reference to FIG. 1, a laser radar system 100 includes a transmitter system 102 that is configured to couple an optical beam from one or more laser diodes or other light sources to an optical fiber 104 through a beam splitter 105. The optical beam exits the optical fiber 104 at a fiber end 106, typically a cleaved or plane polished fiber end retained in a ferrule 107, and is directed along an axis 108 to a corner cube 110 (or other air spaced or solid prism reflector such as a as a right angle prism) and a return mirror 112. The return mirror is 112 is situated along the axis 108 as folded by the corner cube 110 to return the beam through the corner cube 110 to an objective lens 114 that produces a focused interrogation optical beam that is directed to a target 116 with a scanning assembly 120. Focus is typically adjusted by translating the corner cube 110 along the axis 108 using one or more translation stages or other positioners 111A, 111B. As shown in FIG. 1, a displacement Δz of the corner cube 110 along the axis 108 increases beam optical path length by 4Δz. With other focus mechanisms, such as a lens translation, beam optical path length changes by a lens translation distance. At least some portion of the interrogation beam is scattered, reflected, or otherwise returned to the objective lens 114 and coupled via the corner cube 110 and the return mirror 112 to the fiber end 106 and to a receiver system 122. The corner cube 110 is secured to a focus controller 126 that is configured to translate the corner cube 110 along the axis 108 with the translation stages 111A, 111B. Displacement values are typically stored in focus table 127 that permits selection of beam focus adjustment so as to correspond to a target feature radius of curvature. The returned portion of the interrogation beam can be used in laser radar processing or other analysis to provide target measurements.

The laser radar system 100 also includes a processing system 150 that is coupled to the transmitter system 102 and the receiver system 122. Based on transmitted and received optical signals, the processing system 150 can estimate distances and other coordinates associated with the target, or selected portions of the target 116. Measurement results are provided directly for user inspection or relayed to analysis systems. The laser radar system 100 can be configured as a frequency modulated continuous wave system, as an amplitude or phase modulated system, or a combination of such systems. In one example, the interrogation beam is a swept frequency beam and a difference frequency between a returned optical beam and a local oscillator beam is used to determine target feature distance. The processing system 150 is typically coupled to the focus adjustment system 126 and the focus table 127 as well. A right angle prism can be used to provide focus adjustment but corner cubes or roof prisms (solid or air spaced) are generally superior. For convenient illustration, a corner cube is shown in FIG. 1. Generally, the fiber 104 is a polarization maintaining fiber and the beam splitter 105 is a polarizing beam splitter. In the example of FIG. 1, beam focus at a target is adjusted with corner cube displacements, but lens displacements or other focus adjustments can be used.

Gaussian Beam Focus

Figure 2:
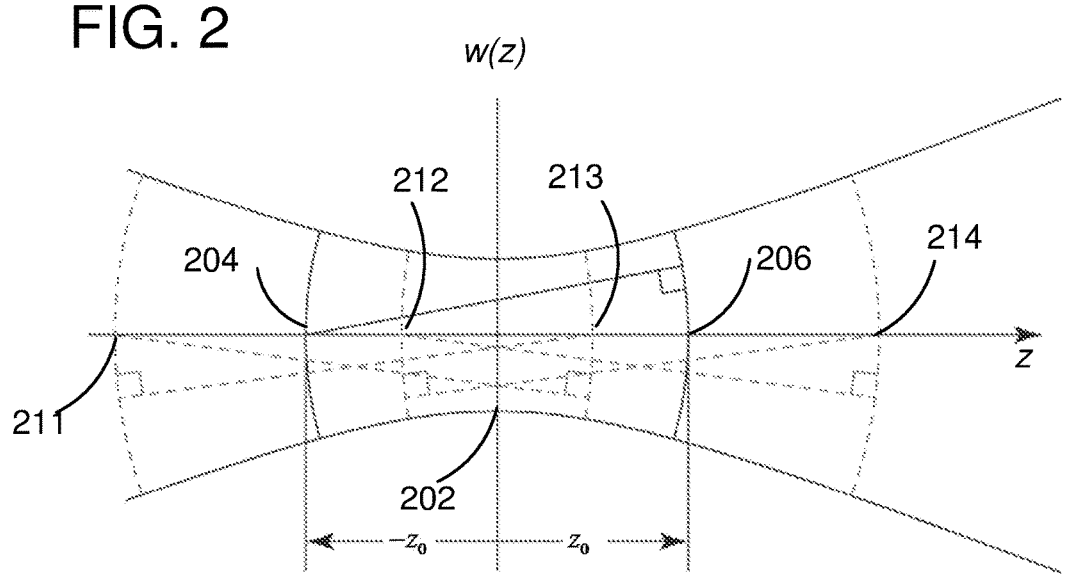
FIG. 2 illustrates beam locations and associated curvatures.

Beam focus can be selected so that beam curvature corresponds to a target feature. As shown in FIG. 2, a laser beam represented as a Gaussian beam has a planar wavefront (minimum curvature) at a beam waist location 202. An absolute value of beam curvature is a maximum at distances ±$z_0$ from the beam waist, wherein $$z_0 = \frac{\pi w_0^2}{\lambda}$$

is referred to as a Rayleigh range, and $w_0$ is a beam waist parameter. For a lowest order Gaussian beam, in cylindrical coordinates (r,z), beam intensity I is given by:

$$I(r, z) = I_0 \left(\frac{w_0}{w(z)}\right)^2 \exp(-2r^2/w^2(z)).$$

Beam radius of curvature R(z) as a function of distance z from a beam waist is given by:

$$R(z) = z\left[1 + \left(\frac{z_R}{z}\right)^2\right],$$

and a spot size parameter is:

$$w(z) = w_0\sqrt{1 + \left(\frac{z}{z_R}\right)^2}.$$

Figure 3:
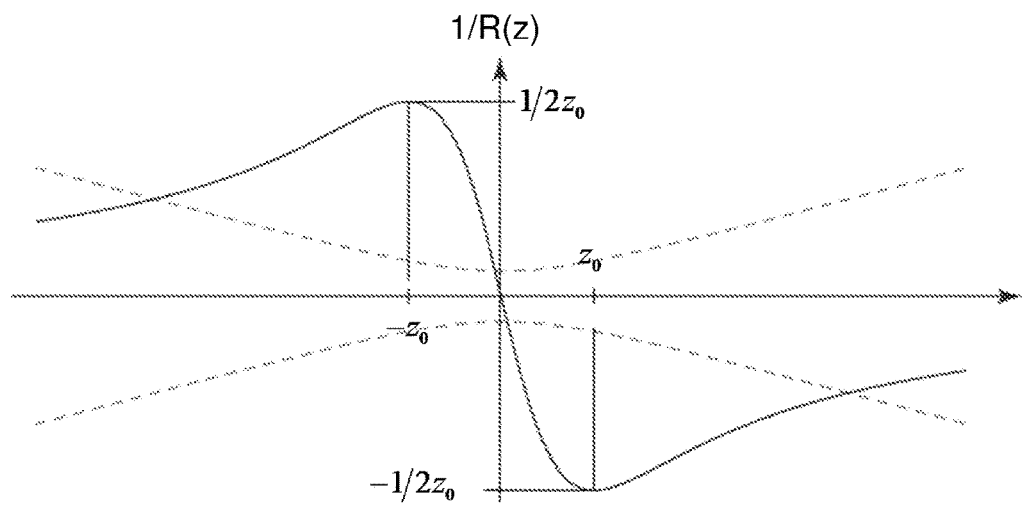
FIG. 3 illustrates beam curvature as a function of displacement from a beam waist.

In FIG. 2, the curvatures having maximum magnitudes are at locations 204, 206 at distances $z=\pm z_0$ from the beam waist location 202. Locations 211-214 have curvatures with the same magnitudes; centers of curvature associated with the curvatures at locations 211, 213 are at locations 213, 211, respectively, and centers of curvature associated with the curvatures at locations 212, 214 are at locations 214, 212, respectively. FIG. 3 illustrates beam curvature 1/R(z) as a function of displacement z from a beam waist, i.e., from z=0, showing maximum magnitudes at $z=\pm z_0$.

In typical laser radar tooling ball measurements, the curvature of the tooling ball is larger than the maximum wavefront curvature of the incident beam. However, when the tooling ball is large enough and close enough, the laser radar can be focused such that the beam wave front is normally incident on the tooling ball surfaces so that their curvatures match. As noted above, the maximum curvature of a Gaussian beam occurs at the Rayleigh range and the magnitude is ½ $z_0$. The transition into what can be referred to as a "retro-focus" regime occurs when the beam radius of curvature at the Rayleigh range $r_{Rayleigh}$ corresponds to a tooling ball radius of curvature, i.e., when the Rayleigh range is equal to one-fourth the diameter of the tooling ball:

$$r_{Rayleigh} = \frac{D_{TB}}{2} = z_0 + z_0^2/z_0 \rightarrow z_0 = \frac{D_{TB}}{4}$$

The condition for being in the retro-focus regime can be roughly stated as, $$z_0 \leq \frac{D_{TB}}{4}.$$

If the radius of curvature of the Gaussian beam is selected to be equal (or approximately equal) to that of the tooling ball, corner cube offset $\Delta z$ can be determined from a conjugate condition that produces the retro-focus condition, wherein m is magnification and F is objective lens magnification:

$$\frac{D_{TB}}{2} =$$

$$z' + \frac{z_0'^2}{z'} = z_0'\left(4\frac{\Delta z}{z_0}\left(1 - 4\frac{m\Delta z}{F}\right) - \frac{mz_0}{F}\right) + z_0' / \left(4\frac{\Delta z}{z_0}\left(1 - 4\frac{m\Delta z}{F}\right) - \frac{mz_0}{F}\right).$$

Solving for $\Delta z$ and expressing the result in terms of the distance between the target-side focal point and the target surface z'=mF instead of magnification m gives:

$$\Delta z = \frac{F^2}{Z'} \frac{1 \pm \sqrt{1 - 4\frac{Z'^2 z_0^2}{F^4}\left(1 + 2\frac{Z'}{D_{TB}}\right)^2}}{8\left(1 + 2\frac{Z'}{D_{TB}}\right)}.$$

As shown, there are two solutions: a first solution corresponding to matching curvatures inside the Rayleigh range, and a second solution corresponding to matching curvatures outside the Rayleigh range. These two positions produce peak coupling efficiency.

The average of these two solutions establishes a location of a local CE minimum between the peak CEs. In the non-retro-focus regime, that expression corresponds to a local maximum in coupling efficiency. The transition, from retro-focus to non-retro-focus, in terms of range, can thus be determined by finding the root of the expression under the square root.

$$1 - 4\frac{Z'^2 z_0^2}{F^4}\left(1 + 2\frac{Z'}{D_{TB}}\right)^2 = 0 \rightarrow Z' = r + \tilde{r} = \frac{D_{TB}}{4}\left(\sqrt{1 + \frac{4F^2}{D_{TB}z_0}} - 1\right).$$

Figure 4A:
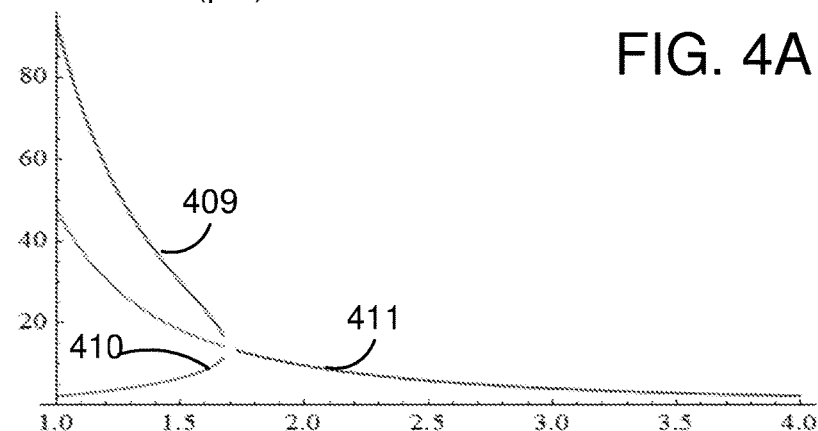
FIG. 4A illustrates minimum beam wave front radius of curvature as a function of target range showing radii of curvature associated with tooling balls of 0.5 inch and 0.25 inch diameter.

FIG. 4A is a plot of associated corner cube shift (4Δz) as a function of range for a selected tooling ball radius; curves 409, 411 corresponds to the first and second solutions, and curve 411 corresponds to an average.

As discussed above, a focus condition for maximum coupling efficiency, assuming no aberrations and no diffracting apertures or obscurations, is a function of tooling ball diameter, lens focal length F, and Rayleigh range of the beam leaving the fiber. This can be conveniently described in terms of a small adjustment from the focus condition that minimizes the spot diameter at the target, referred to here as a surface focus. This adjustment can be divided into two regions: the first region, closest to the lens, is the retro-focus region, or a near-focus region, while the second region, being farther away is referred to as a distant-focus region.

Surface Focus

A surface focus condition refers to minimization of a beam spot size at a surface under investigation and can be equally referred to as a "minimum spot focus" condition. Note that this is not exactly the same thing as placing the waist at the target—in actuality the waist will be slightly in front of the target, but this difference is typically on the order of a few microns at 1 m range, up to a few hundred microns at 50 m range. The surface focus condition can be expressed as:

$$-Z = 4(Z_{cc} + \tilde{Z}_{cc}) = \frac{F^2}{Z'} = \frac{F^2}{r - \tilde{r}},$$

wherein Z and Z' are paraxial object and image distances (fiber and surface) as measured from the focal planes in the respective optical spaces. $Z_{CC}$ is a corner cube stage position and $\tilde{Z}_{CC}$ is an arbitrary offset that is determined by a fabricated system geometry and is normally determined experimentally. Similarly, r is a range, as measured from a center of rotation, while $\tilde{r}$ is an offset that depends on the fabricated geometry, also normally determined from experiment. Putting this together, the following can be used to determine corner cube focus position:

$$Z_{cc} = \frac{F^2/4}{Z'} + \tilde{Z}_{cc}$$

$$Z' = r + \tilde{r}.$$

Near-Distant Focus Transition

The best focus for a tooling ball can be divided into two ranges (distant focus and near focus) that depend on the diameter of the tooling ball. The transition range between the two regimes is given by:

$$r_{transition} = \tilde{r} + \frac{D_{TB}}{4}\left(\sqrt{1 + \frac{4F^2}{D_{TB}z_0}} - 1\right).$$

Distant Focus

When the range greater than the transition range $r_{transition}$, a distant focus formula can be used for corner cube focus position:

$$Z_{cc} = \frac{F^2}{4Z'} + \tilde{Z}_{cc} - \frac{F^2/8Z'}{1 + 2\frac{Z'}{D_{TB}}} \quad (1)$$

Note that the first two terms constitute paraxial focus—focusing the fiber tip to the tooling ball surface.

Near Focus

Although there are two solutions to the near focus problem, the focus inside the Rayleigh range tends to be the preferred focus position because it provides a tooling ball measurement profile that provides better fitting accuracy. A near focus equation is:

$$z_{CC} = \frac{F^2/4}{Z'} + \tilde{Z}_{cc} - \frac{F^2/8Z'}{1 + 2\frac{Z'}{D_{TB}}}\left\{1 - \sqrt{1 - 4\frac{Z'^2 z_0^2}{F^4}\left(1 + 2\frac{Z'}{D_{TB}}\right)^2}\right\} \quad (2)$$

The system parameters of the above equations (such as the focal length F of the lens, the arbitrary offset $\tilde{z}_{CC}$, and the source Rayleigh range $z_0$) are to be determined by calibration, possibly with tooling ball measurements, and the tooling ball diameter can be provided by the user. Once system parameters are determined, and an approximate range is known, possibly through an initial sub-optimal tooling ball measurement, or by prior knowledge, the focus can be set using one of the above focus formulae—either distant focus or near focus depending upon which side of the transition the tooling ball lands. Preferred focus positions can be stored in a focus table for laser use. As noted previously, this applies to other focus mechanisms, and corner cube mechanisms are only one example.

Figure 4B:
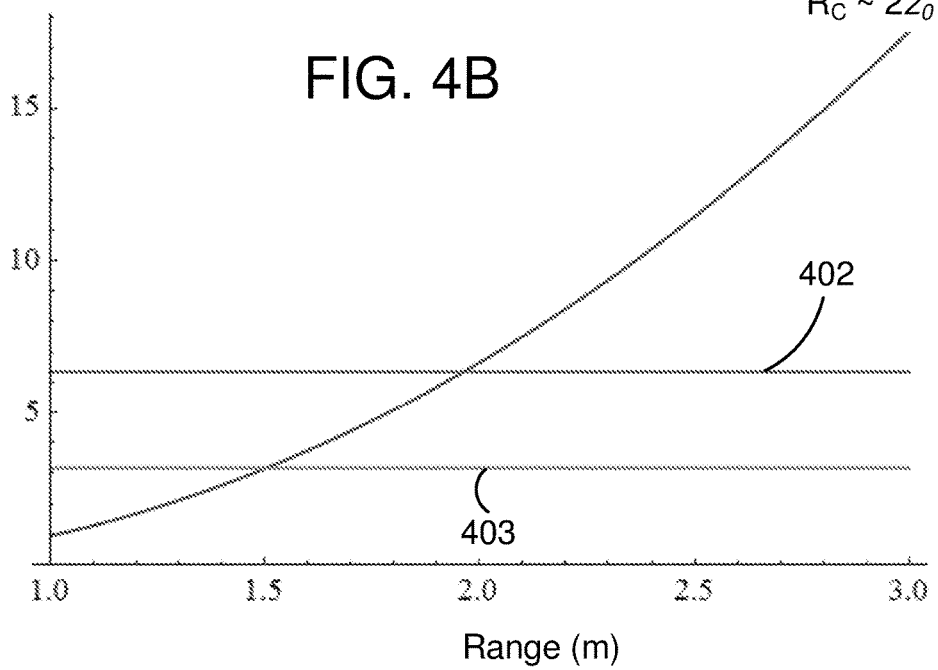
FIG. 4B illustrate corner cube shifts as a function of range.

As discussed above, for targets having an associated curvature such as tooling balls, a beam curvature can be adjusted to correspond to a target curvature. For example, as shown in FIG. 4B, a minimum wavefront radius of curvature is plotted versus range. Horizontal lines 402, 403 correspond to radii of curvature associated with half inch and quarter inch tooling balls, respectively, indicating that a beam radius of curvature can be selected to match either of these tooling ball radii.

Figure 5A:
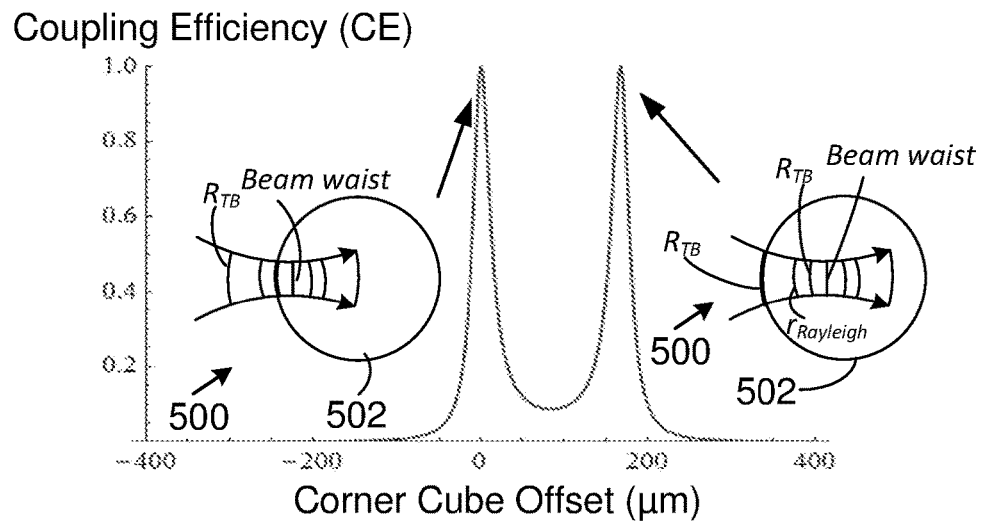
FIGS. 5A-5B illustrate coupling efficiency as a function of corner cube focus offset for a beam directed to a tooling ball.
Figure 5B:
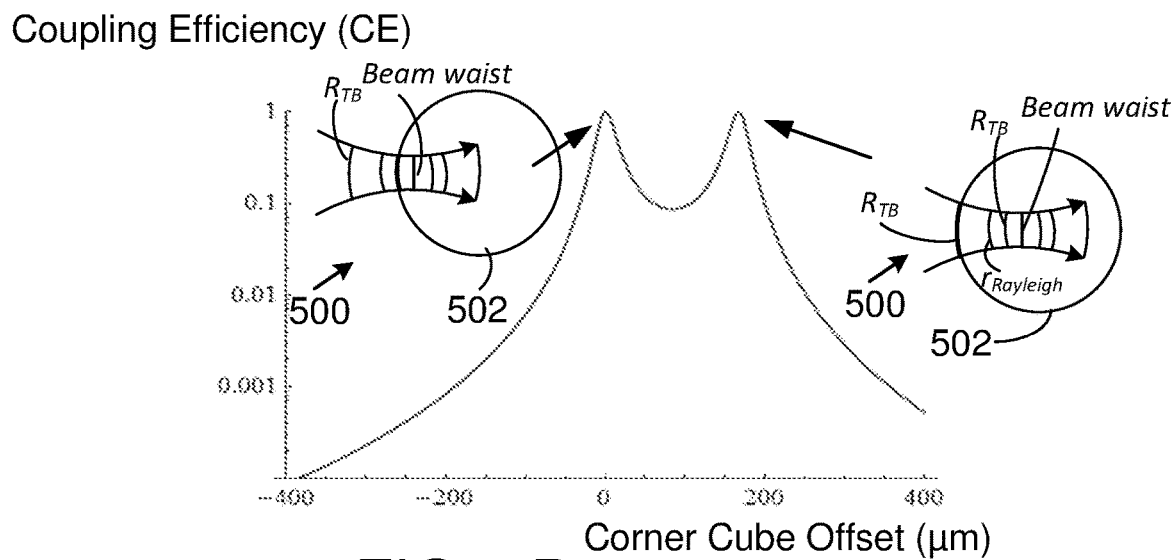
Figure 6:
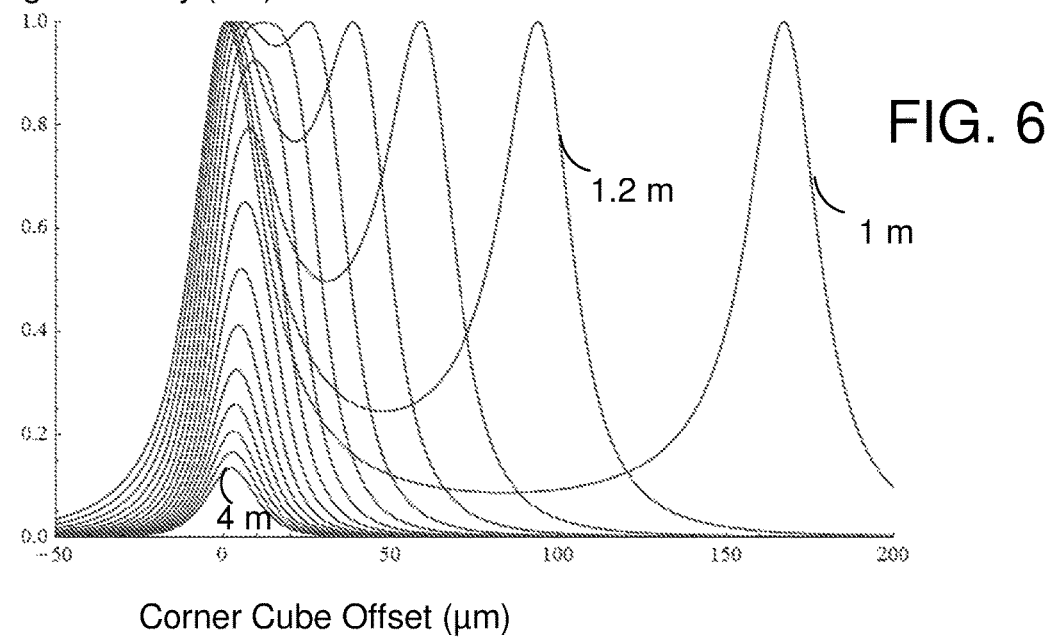
FIG. 6 illustrates coupling efficiency (CE) as a function of corner cube offset for target ranges from 1 m to 4 m for a tooling ball having a diameter of 0.5 inch. For some ranges, maximum CE occurs at two different ranges, and in the example of FIG. 6, these different ranges merge at a range of about 2 m.
Figure 7:
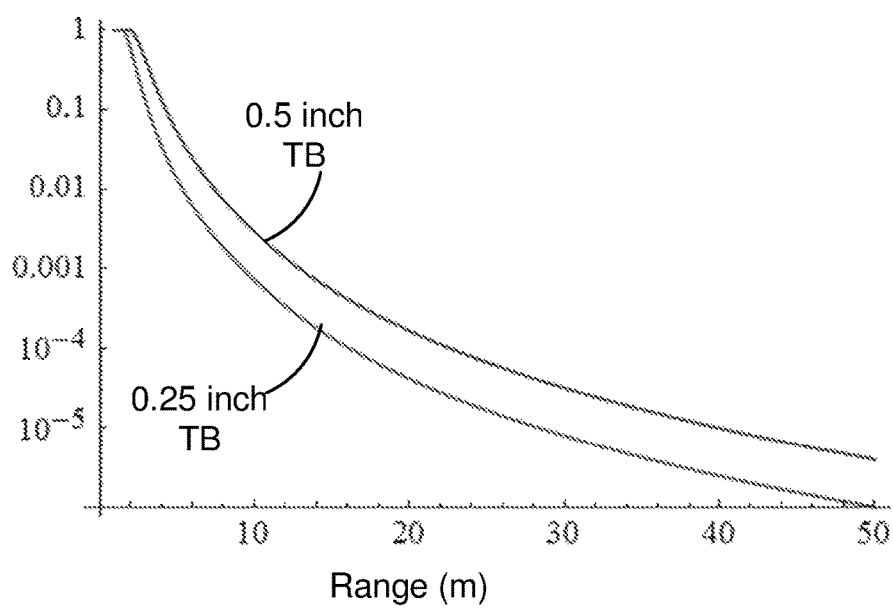
FIG. 7 illustrates coupling efficiency as a function of range for tooling balls having diameters of 0.5 inch and 0.25 inch.

FIGS. 5A-5B illustrate coupling efficiency as a function of tooling ball position with respect to a beam waist as a function of corner cube offset. Corner cube position is relative to the position at which the fiber tip is conjugate to the tooling ball surface, but does not necessarily correspond to either maximum coupling efficiency location. Tooling balls 502 are situated with respect to a beam so that the beam and the tooling balls have the same curvatures. An input beam 500 is situated so that beam radii of curvature inside and outside of a Rayleigh range correspond to a tooling ball radius of curvature. FIG. 6 illustrates coupling efficiency for a plurality of ranges. As shown, at larger ranges the separation between the two maximum coupling efficiency positions decreases and they merge (at about 2 m for a 0.5 inch tooling ball). At more distant ranges, coupling efficiency decreases. FIG. 7 shows coupling efficiency versus range for 0.25 inch and 0.5 inch tooling balls.

FIG. 8 illustrates a representative focus system 800 that receives an optical beam from a fiber 802 and directs the beam along an axis 804 to a beam forming lens 806. The lens 806 and the fiber 802 are coupled to respective translational stages to adjust beam focus, typically based on a stored focus table 814 in a memory or storage device. The beam focus is adjusted so that target locations 820, 821 have a common beam curvature and for convenience, a location of a beam waist and a Rayleigh range are indicated. As discussed above, focus adjustments can be based on near focus or distant focus conditions, and focus inside or outside a Rayleigh range can be selected for a near focus condition, although focus inside the Rayleigh range is generally more convenient. In this example, beam displacement $\Delta z$ along the axis 804 corresponds to optical path difference, in contrast to corner cube based focus in which a displacement $\Delta z$ of a corner cube is associated with an optical path difference of $4\Delta z$. The beam focus systems and methods such as illustrate in FIG. 8 can be used in systems other than laser radar so as to produce beams that correspond to one or more target features.

Figure 9A:
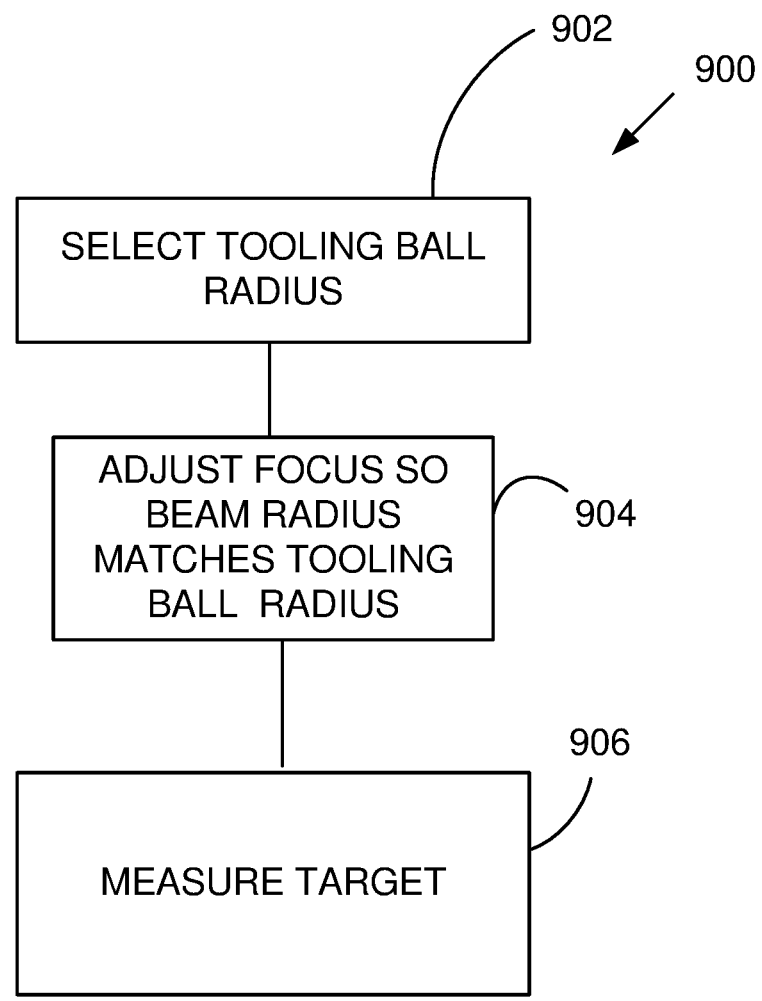
FIG. 9A illustrates a representative focus adjustment method.

FIG. 9A illustrates a representative method 900 that includes selecting a tooling ball radius 902 and adjusting a beam focus at 904 based on the tooling ball radius. At 906, a target is measured, typically to provide a series of measurements associated with a target surface.

Figure 9B:
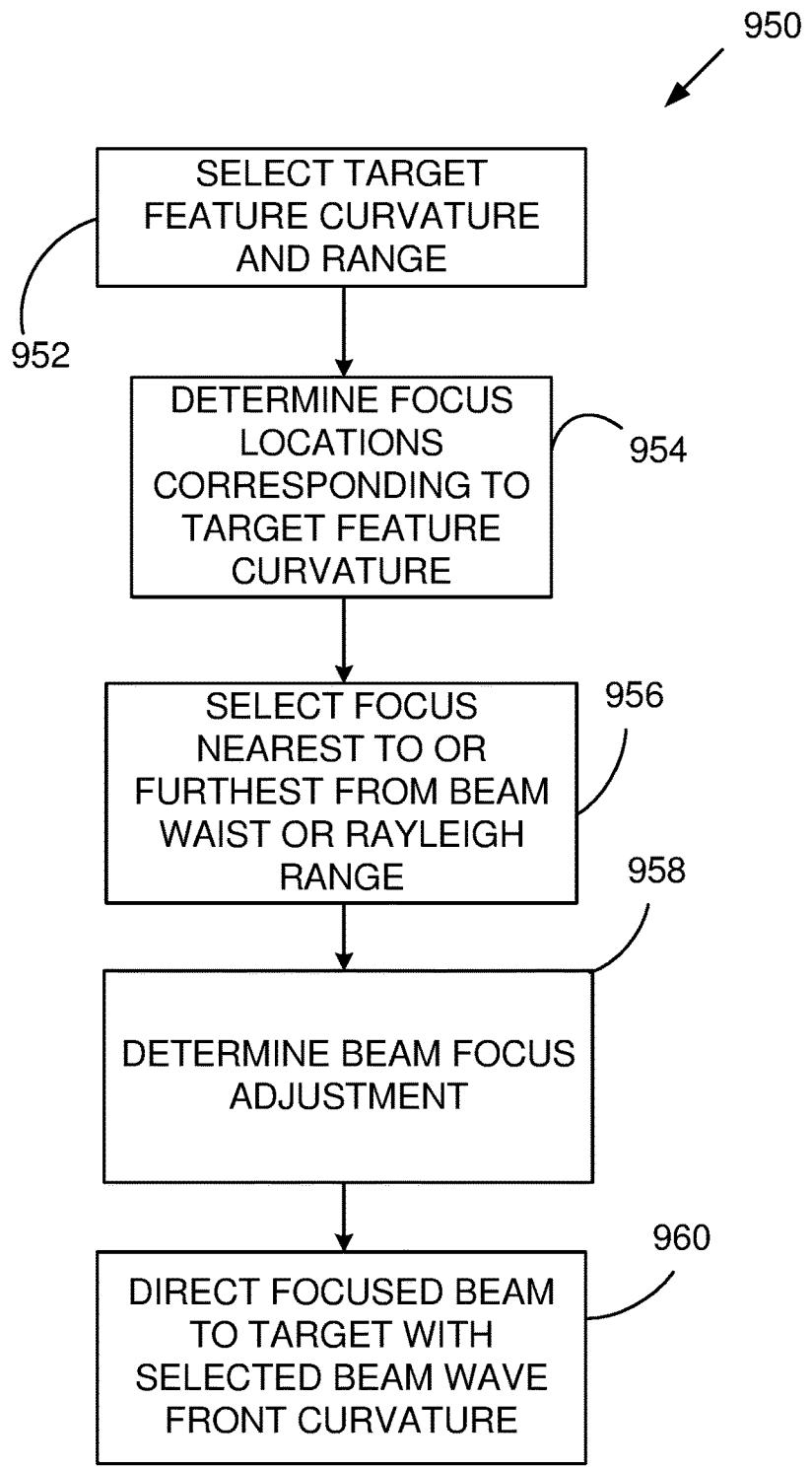
FIG. 9B illustrates another representative focus adjustment method.

FIG. 9B illustrates another representative method 950 that includes selecting a target feature curvature and range at 952. At 954, one or more focus locations such as one of two possible near focus positions or a distant focus position are determined based on target range and target feature curvature. A particular bean focus position such a focus nearest or furthest from a Rayleigh range is selected at 956. Based on the selected focus position, a corresponding beam focus adjustment is determined and applied to a focus mechanism at 958, and at 960, a beam is directed to a target to produce a selected beam curvature at a particular location with respect to the target.

Figure 10:
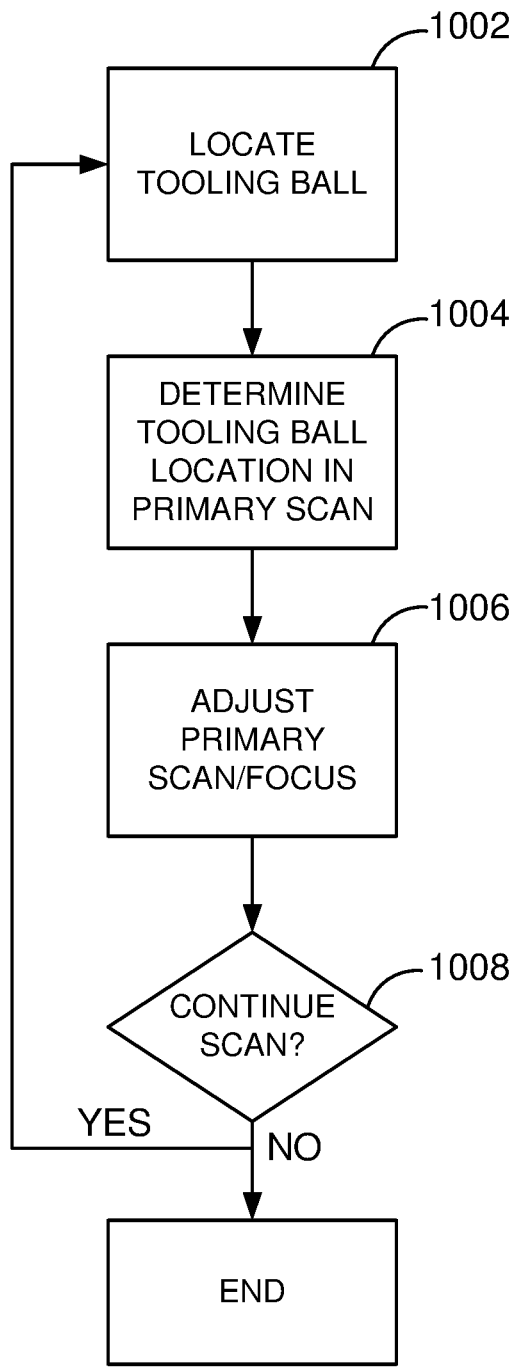
FIG. 10 is a block diagram of a representative method of tracking a tooling ball that is secured to a substrate or target.

FIG. 10 illustrates a representative method of tracking a tooling ball that is secured to a substrate or target. One or more tooling balls can be secured to a target to provide reference points for coordinate determinations. Tooling balls generally include a reflective ball-shaped surface in order to provide ample reflection of an interrogation beam in a laser-based measurement apparatus such as a laser radar.

As shown in FIG. 10, at 1002 a tooling ball location is identified and recorded based on returned portions of a scanned interrogation optical beam. The optical beam can be scanned in a variety of patterns such as circles, spirals, w's, or zig-zags so as to track a tooling ball. At 1004, the identified location is evaluated to determine a position with respect to a primary scan. The primary scan is adjusted at 1006 so that the tooling ball location is at a preferred location with respect to the primary scan and a focus is adjusted based on a tooling ball radius of curvature or other target feature. Typically, the primary scan is adjusted so that the tooling location is approximately centered within a primary scan range. At 1008, a determination is made regarding additional scanning.

Figure 11:
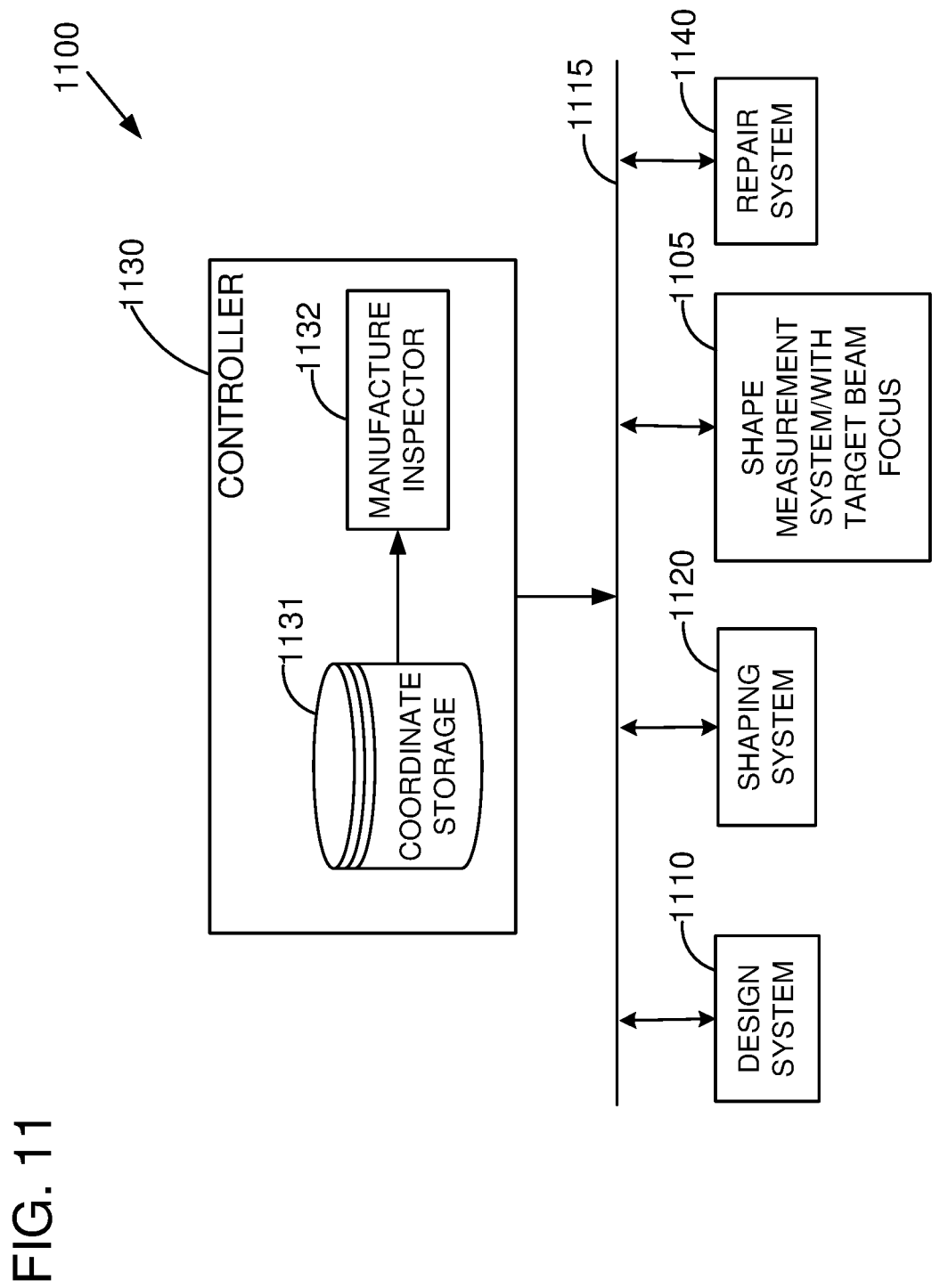
FIG. 11 is a block diagram of a representative manufacturing system that includes a laser radar or other profile measurement system to manufacture components, and assess whether manufactured parts are defective or acceptable.

FIG. 11 illustrates a representative manufacturing system 1100 suitable for producing one or more components of a ship, airplane, or part of other systems or apparatus, and for evaluating and reprocessing such manufactured components. The system 1100 typically includes a shape or profile measurement system 1105 such as the laser radar 100 discussed above or other apparatus that adjusts a beam curvature based on one or more target features. The manufacturing system 1100 also includes a design system 1110, a shaping system 1120, a controller 1130, and a repair system 1140. The controller 1130 includes coordinate storage 1131 configured to store measured and design coordinates or other characteristics of one or more manufactured structures as designed and/or measured. The coordinate storage 1131 is generally a computer readable medium such as hard disk, random access memory, or other memory device. Typically, the design system 1110, the shaping system 1120, the shape measurement system 1105, and a repair system 1140 communicate via a communication bus 1115 using a network protocol.

The design system 1110 is configured to create design information corresponding to shape, coordinates, dimensions, or other features of a structure to be manufactured, and to communicate the created design information to the shaping system 1120. In addition, the design system 1110 can communicate design information to the coordinate storage 1131 of the controller 1130 for storage. Design information typically includes information indicating the coordinates of some or all features of a structure to be produced.

The shaping system 1120 is configured to produce a structure based on the design information provided by the design system 1110. The shaping processes provided by the shaping system 1120 can include casting, forging, cutting, or other process. The shape measurement system 1105 is configured to measure the coordinates of one or more features of the manufactured structure and communicate the information indicating measured coordinates or other information related to structure shape to the controller 1130.

A manufacture inspector 1132 of the controller 1130 is configured to obtain design information from the coordinate storage 1131, and compare information such as coordinates or other shape information received from the profile measuring apparatus 100 with design information read out from the coordinate storage 1131. The manufacture inspector 1132 is generally provided as a processor and a series of computer-executable instructions that are stored in a tangible computer readable medium such as random access memory, a flash drive, a hard disk, or other physical devices. Based on the comparison of design and actual structure data, the manufacture inspector 1132 can determine whether or not the manufacture structure is shaped in accordance with the design information, generally based on one or more design tolerances that can also be stored in the coordinate storage 1131. In other words, the manufacture inspector 1132 can determine whether or not the manufactured structure is defective or nondefective. When the structure is not shaped in accordance with the design information (and is defective), then the manufacture inspector 1132 determines whether or not the structure is repairable. If repairable, then the manufacture inspector 1132 can identify defective portions of the manufactured structure, and provide suitable coordinates or other repair data. The manufacture inspector 1132 is configured to produce one or more repair instructions or repair data and forward repair instructions and repair data to the repair system 1140. Such repair data can include locations requiring repair, the extent of re-shaping required, or other repair data. The repair system 1140 is configured to process defective portions of the manufactured structure based on the repair data.

Figure 12:
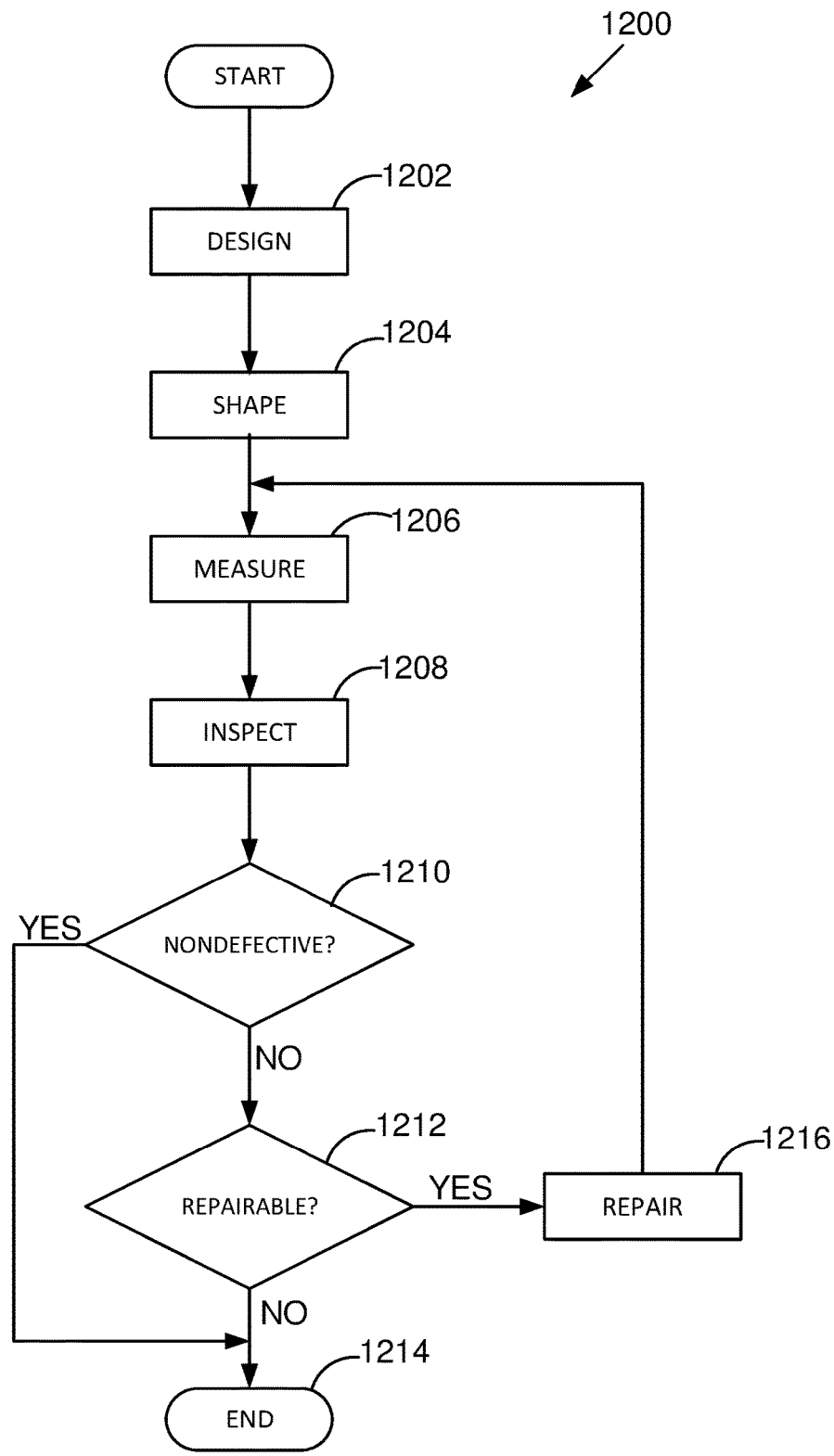
FIG. 12 is a block diagram illustrating a representative manufacturing method that includes profile measurement to determine whether manufactured structures or components are acceptable, and if one or more such manufactured structures can be repaired.

FIG. 12 is a flowchart showing a representative manufacture method 1200 that can incorporate manufacturing systems such as illustrated in FIG. 11. At 1202, design information is obtained or created corresponding to a shape of a structure to be manufactured. At 1204, the structure is manufactured or "shaped" based on the design information. At 1206, coordinates, dimensions, or other features of the manufactured structure are measured with a profile measurement system such as the laser radar systems described above to obtain shape information corresponding to the structure as manufactured. At 1208, the manufactured structure is inspected based on a comparison of actual and design dimensions, coordinates, manufacturing tolerance, or other structure parameters. At 1210, if the manufactured structure is determined to be nondefective, the manufactured part is accepted and processing ends at 1214. If the manufactured part is determined to be defective at 1210 by, for example, the manufacture inspector 1132 of the controller 1130 as shown in FIG. 11, then at 1212 it can be determined whether the manufacture part is repairable. If repairable, the manufactured part is reprocess or repaired at 1216, and then measured, inspected, and reevaluated at 1206, 1208, 1210, respectively. If the manufactured part is determined to be unrepairable at 1212, the process ends at 1214.

According to the method of FIG. 12, using a profile measurement system to accurately measure or assess coordinates or other features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. These particular systems and methods are exemplary only, and other arrangements can be used.

In the above embodiment, the structure manufacturing system 1200 can include a profile measuring system such as the laser radar 100, the design system 1110, the shaping system 1120, the controller 1130 that is configured to determine whether or not a part is acceptable (inspection apparatus), and the repair system 1140. However, other systems and methods can be used and these examples are provided for convenient illustration.

In view of the many possible embodiments to which the principles of the disclosed technology may be applied, it should be recognized that the illustrated embodiments are only preferred examples and should not be taken as limiting in scope.

I therefore claim as my invention all that comes within the scope and spirit of the appended claims.

I claim:

1. A method, comprising:
   directing an interrogation optical beam to a target; and
   adjusting the interrogation optical beam based on a target feature so that a radius of curvature of the interrogation optical beam at a target surface corresponds to a target feature radius of curvature.

2. The method of claim 1, wherein the target feature is a tooling ball radius of curvature.

3. The method of claim 1, further comprising determining whether the target feature corresponds to a near focus or a distant focus condition.

4. The method of claim 3, wherein if the target feature radius corresponds to a near focus, the interrogation beam is adjusted so that the target feature is within a Rayleigh range of a beam focus.

5. The method of claim 1, further comprising determining two beam focus locations having an interrogation beam radius of curvature corresponding to the target feature radius of curvature, and selecting the beam focus location that is closer to an interrogation beam waist.

6. The method of claim 1, further comprising determining two beam focus locations having an interrogation beam radii of curvature corresponding to the target feature, and selecting the beam focus location that is at least a Rayleigh range from the interrogation beam waist.

7. The method of claim 1, further comprising establishing a plurality of focus adjustments corresponding to respective target distances, wherein the target distances are selected based on the radius of curvature associated with the target feature, wherein the radius of curvature of the interrogation optical beam is adjusted based on a selected focus adjustment.

8. The method of claim 7, further comprising storing the focus adjustments in a memory, wherein the interrogation optical beam is adjusted by retrieving the selected focus adjustment from the memory.

9. The method of claim 1, further comprising establishing a plurality of focus adjustments corresponding to respective target distances, wherein the target distances are selected based on a plurality of radii of curvature associated with one or more target features and storing the focus adjustments in a memory.

10. The method of claim 9, wherein the interrogation optical beam is adjusted based on a focus adjustment that is retrieved from the memory.

11. The method of claim 1, wherein the interrogation optical beam is focused at least two distances so as to identify two maximum values in a magnitude of a detected returned portion of the interrogation optical beam, and the interrogation optical beam is adjusted to produce an interrogation beam focus corresponding to one of the maximum values to obtain a target feature measurement.

12. The method of claim 1, further comprising:
    determining a distance to a target;
    based on the distance, selecting a beam focus associated with a near focus or a distant focus.

13. The method of claim 1, further comprising determining a transition radius of curvature, and if a target dimension is less than or greater than the target radius of curvature, selecting a beam focus associated with a near focus or distant focus.

14. The method of claim 13, wherein the transition radius of curvature is given by $$r_{transition} = \tilde{r} + \frac{D_{TB}}{4}\left(\sqrt{1 + \frac{4F^2}{D_{TB}z_0}} - 1\right),$$

wherein $D_{TB}$ is a tooling ball diameter, F is a focal length of an objective lens that produces the beam focus, $z_0$ is a Rayleigh range, and $\tilde{r}$ is a focus offset.

15. A laser radar, comprising:
    an interrogation beam source; and
    an optical focusing system including one or more optical components situated to direct the interrogation optical beam to a target, the focusing system situated to adjust the interrogation optical beam so as to have a beam radius of curvature based on a target feature.

16. The laser radar of claim 15, further comprising a memory that stores a plurality of focus distances associated with the interrogation beam radius of curvature.

17. The laser radar of claim 15, wherein the optical focusing system selectively directs the interrogation optical beam to the target so that the interrogation beam radius of curvature corresponds to an interrogation beam location within a Rayleigh range defined by an interrogation beam waist.

18. The laser radar of claim 15, wherein the optical focusing system directs the interrogation optical beam to the target so that the interrogation beam radius of curvature corresponds to an interrogation beam location within a Rayleigh range of the interrogation beam or more distant than the Rayleigh range.

19. The laser radar of claim 15, wherein the optical focusing system determines that a range of the target corresponds to a near focus or a distant focus so as to adjust the interrogation beam focus.

20. The laser radar of claim 15, wherein the optical focusing system determines that a range of the target corresponds to the near focus or the distant focus based on a transition range.

21. The laser radar of claim 20, wherein the one or more optical components includes an objective lens situated to focus the interrogation optical beam at a tooling ball situated at the target, wherein the transition range is $$r_{transition} = \tilde{r} + \frac{D_{TB}}{4}\left(\sqrt{1 + \frac{4F^2}{D_{TB}z_0}} - 1\right),$$

wherein $D_{TB}$ is a tooling ball diameter, F is the objective lens focal length, $z_0$ is a beam Rayleigh range, and $\tilde{r}$ is a constant beam offset.

22. A focus system, comprising:
    an objective lens;
    a translation stage coupled to the objective lens and situated to establish a beam focus with the objective lens so as to produce a beam radius of curvature at a target corresponding to a radius of curvature of a feature of the target.

23. The focus system of claim 22, further comprising a memory that stores a plurality of focus distances associated with a plurality of beam radii of curvature.

24. The focus system of claim 22, wherein the translation stage is selectively adjustable so that the beam radius of curvature corresponds to a beam location within a Rayleigh range defined by a beam waist.

25. The focus system of claim 22, wherein the translation stage is situated to establish the beam focus across a range of the target corresponding to a near focus or a distant focus based on a transition range.

26. The focus system of claim 25, wherein the transition range is $$r_{transition} = \tilde{r} + \frac{D_{TB}}{4}\left(\sqrt{1 + \frac{4F^2}{D_{TB}z_0}} - 1\right),$$

wherein $D_{TB}$ is a tooling ball diameter, F is the objective lens focal length, $z_0$ is a beam Rayleigh range, and $\tilde{r}$ is a constant beam offset.

* * * * *